United States Patent
Hüttner

(10) Patent No.: US 7,207,428 B2
(45) Date of Patent: Apr. 24, 2007

(54) TRANSPORT DEVICE FOR CONTAINERS

(75) Inventor: Johann Hüttner, Mallerdorf-Pfaffenberg (DE)

(73) Assignee: Krones AG, Neutraubling (DE)

( * ) Notice: Subject to any disclaimer, the term of this patent is extended or adjusted under 35 U.S.C. 154(b) by 84 days.

(21) Appl. No.: 10/513,161

(22) PCT Filed: May 14, 2003

(86) PCT No.: PCT/EP03/05022

§ 371 (c)(1),
(2), (4) Date: Apr. 21, 2005

(87) PCT Pub. No.: WO03/099687

PCT Pub. Date: Dec. 4, 2003

(65) Prior Publication Data

US 2005/0217974 A1    Oct. 6, 2005

(30) Foreign Application Priority Data

May 24, 2002    (DE) .......................... 202 08 127 U

(51) Int. Cl.
*B65G 43/00* (2006.01)
(52) U.S. Cl. ....................... 198/444; 198/445
(58) Field of Classification Search ................ 198/444, 198/445, 452, 464.1, 571, 572
See application file for complete search history.

(56) References Cited

U.S. PATENT DOCUMENTS

| | | | |
|---|---|---|---|
| 2,951,574 A * | 9/1960 | Craig | 198/836.3 |
| 3,487,908 A | 1/1970 | Garrett | |
| 3,554,353 A * | 1/1971 | Raudat | 198/836.3 |
| 3,767,027 A * | 10/1973 | Pund et al. | 198/452 |
| 3,982,790 A * | 9/1976 | Storm et al. | 406/87 |
| 4,173,276 A * | 11/1979 | Raudat et al. | 198/437 |
| 4,216,855 A * | 8/1980 | Raudat | 198/633 |
| 4,390,091 A * | 6/1983 | Gonzalez | 198/358 |
| 4,432,189 A * | 2/1984 | Raudat | 53/497 |
| 4,880,104 A * | 11/1989 | Evans et al. | 198/445 |
| 5,411,129 A | 5/1995 | Crouch | |
| 5,515,668 A * | 5/1996 | Hunt et al. | 53/543 |
| 6,209,707 B1 * | 4/2001 | Ronchi | 198/445 |
| 6,244,429 B1 * | 6/2001 | Drewitz et al. | 198/836.3 |
| 6,250,851 B1 * | 6/2001 | Ouellette et al. | 406/81 |

FOREIGN PATENT DOCUMENTS

| | | |
|---|---|---|
| DE | 2243227 | 3/1974 |
| DE | 29501098.3 | 4/1995 |
| DE | 29617148 | 12/1997 |

* cited by examiner

*Primary Examiner*—Joe Dillon, Jr.
(74) *Attorney, Agent, or Firm*—Marshall, Gerstein & Borun LLP

(57) ABSTRACT

A conveyor device for containers having multiple narrow lanes formed by guide railings adjustable horizontally across the direction of conveyance, with horizontally adjustable sensors for the containers arranged above the narrow lanes across the direction of conveyance. The adjustable sensors are coupled to the guide railings in such a way that they are necessarily adjusted along with an adjustment of the guide railings.

4 Claims, 3 Drawing Sheets

TRANSPORT DEVICE FOR CONTAINERS

FIELD OF THE DISCLOSURE

This disclosure relates to a conveyor line for containers, in particular bottles, cans or the like.

BACKGROUND

With the known conveyor devices of this type, the railings on the one hand and the sensors on the other hand are mounted on separate mounts and are adjustable independently of one another. A joint height adjustment to adapt to different container heights is optionally also possible for the sensors. It is therefore extremely time-consuming and tedious to switch the known conveyor device to a different type of container.

There have also already been proposals for designing a set of interchangeable sensors including the mount as whole, so they can be replaced by another set of sensors in the case of a changeover (Unexamined German Patent 22 43 227). In this approach, a suitable set of sensors with the mount is required for each container diameter, which results in high investment costs. Nevertheless both the railings and the sensors must be manipulated separately in the event of a changeover.

SUMMARY OF THE DISCLOSURE

The object of this disclosure is to permit a significant shortening of the changeover time in a conveyor device of the type defined in the preamble and to do so with simple means.

In the case of the disclosed conveyor device, only the railings need be adjusted in the event of a changeover. The sensors are automatically adjusted with them. This drastically reduces the changeover times and the demands on the operating personnel.

BRIEF DESCRIPTION

Figure 1:
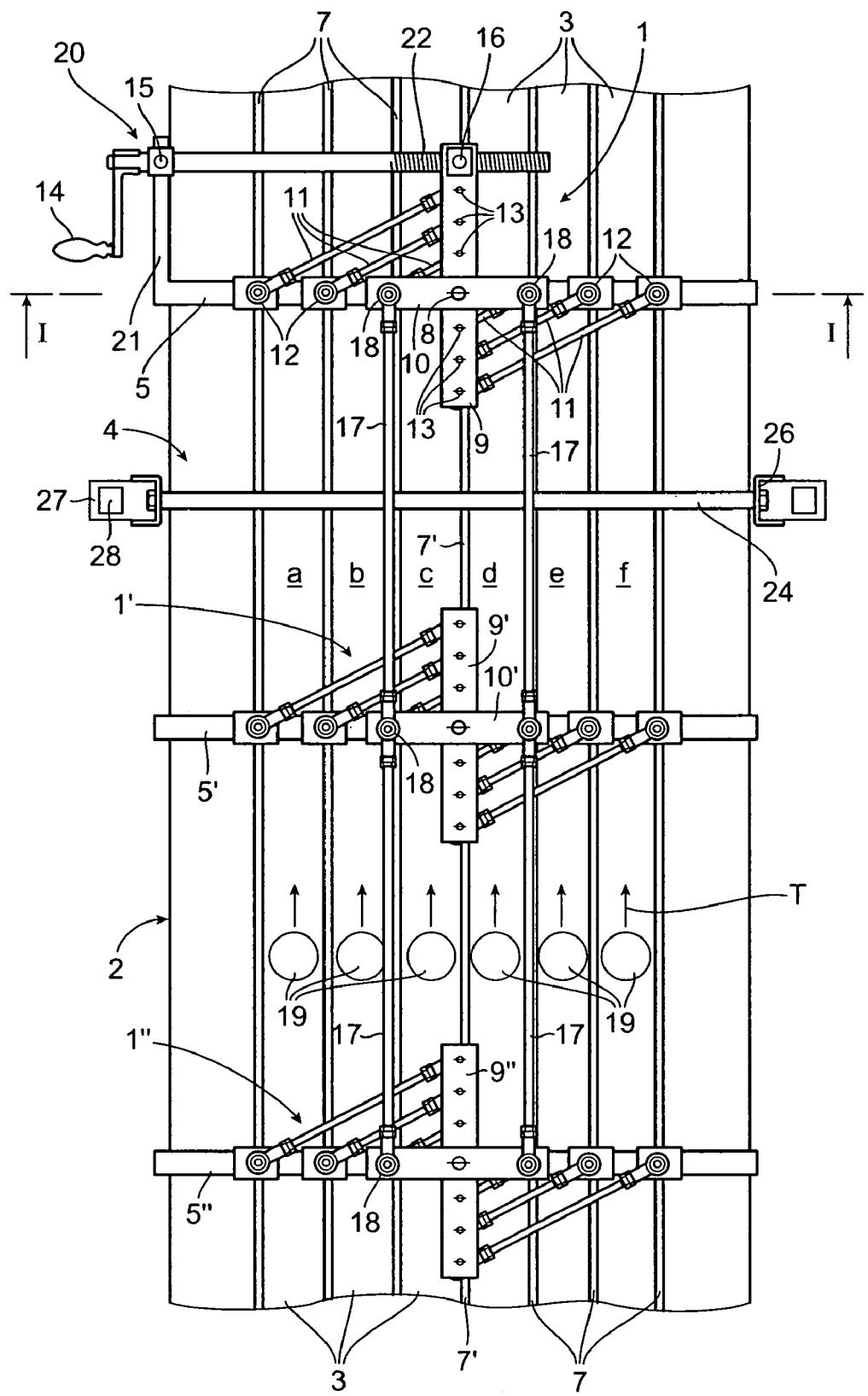

An exemplary embodiment of this invention is described below on the basis of the drawings, which show:

FIG. 1 a top view of a conveyor device for the containers

Figure 2:
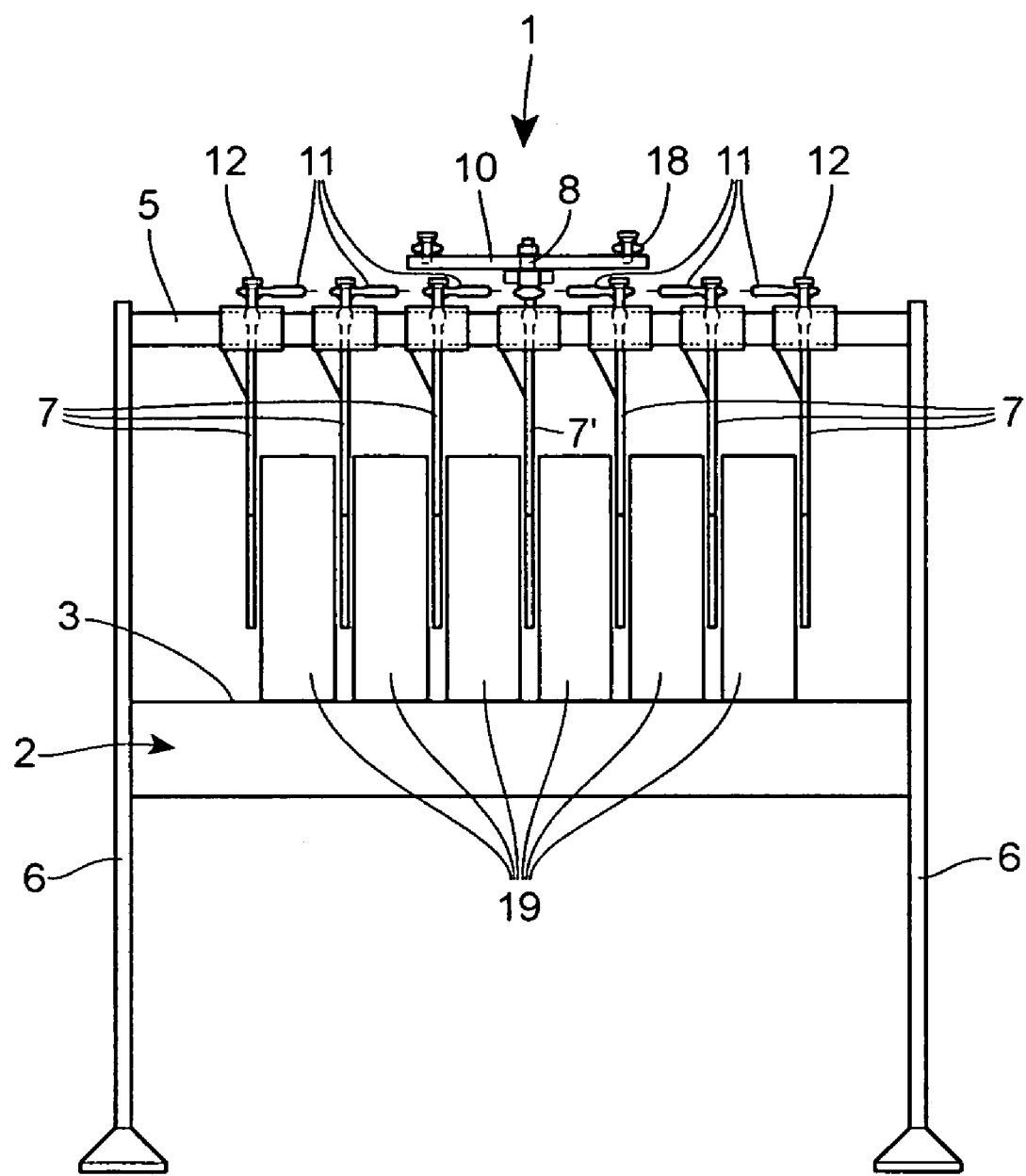

FIG. 2 section I—I according to FIG. 1

Figure 3:
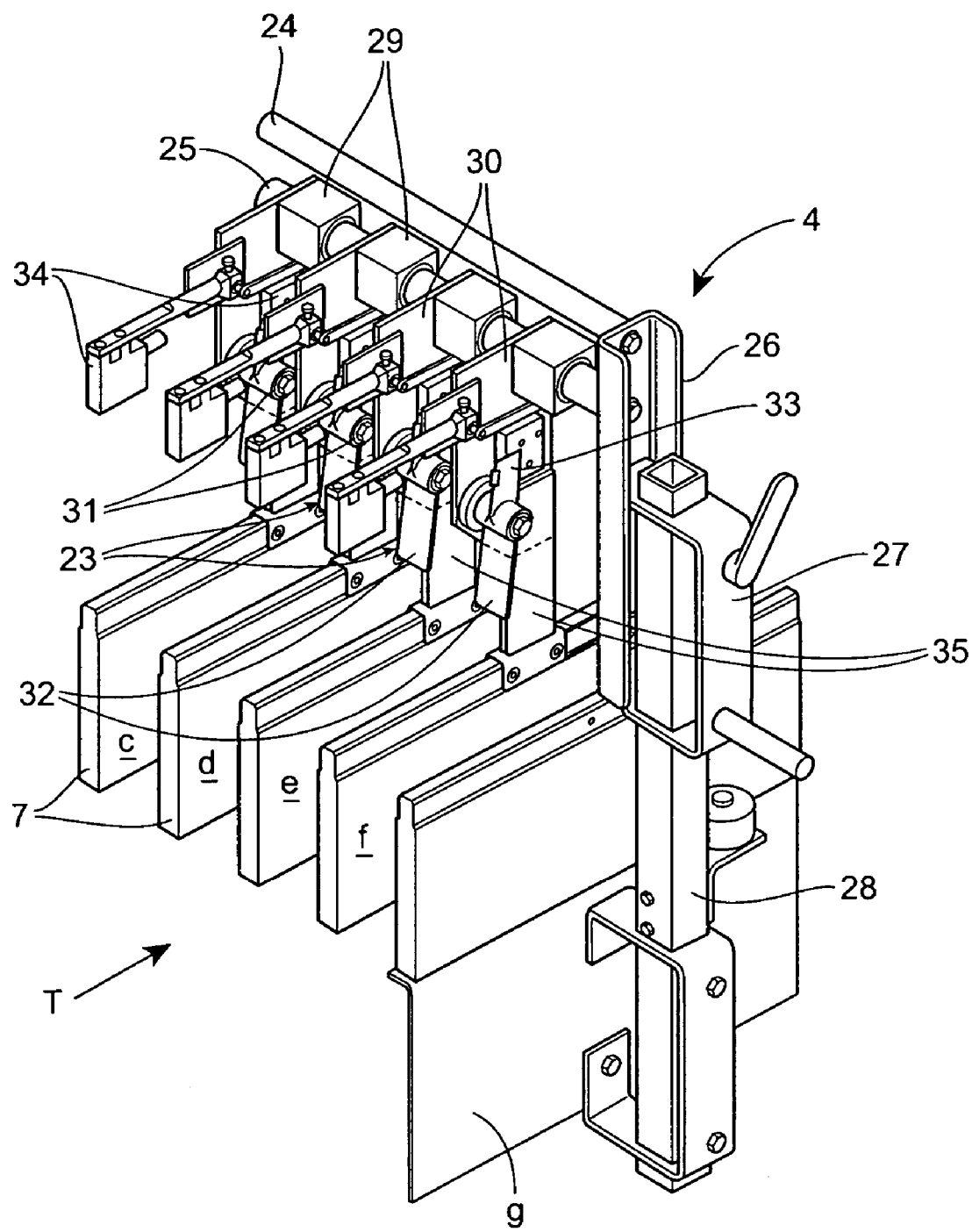

FIG. 3 a perspective view of the sensor arrangement of the conveyor device according to FIG. 1 and FIG. 2.

DETAILED DESCRIPTION OF THE DISCLOSURE

As shown in FIG. 1 and FIG. 2, the conveyor device 2 has multiple horizontal conveyor belts 3 arranged side by side. Running across the direction of conveyance T, a guide rod 5 is arranged over the conveyor belts 3 running across the direction of conveyance T and is held in the stationary mount at both ends by the framework 6 of the conveyor device 2. Parallel guide railings 7 which are aligned along the direction of conveyance are suspended so they are laterally displaceable in relation to one another along this guide rod 5, except for the center guide railing 7', which is undisplaceably attached to the guide rod 5. A bearing pin 8 that protrudes vertically upward is attached to this guide railing 7' and a flat iron 9 which is shown aligned in parallel with the guide railings 7 in FIG. 1 is mounted on the bearing pin so that it can pivot in a plane parallel to the plane of conveyance. A second flat iron 10 is rotationally mounted on this first flat iron 9 so that it can rotate 90 degrees in the plane of pivoting.

As shown in FIG. 1, each guide railing 7, except for the central undisplaceable guide railing 7', is connected at its ends to the first flat iron 9 by a rigid rod 11 having a hinged joint 12 and 13. The second hinged joints 13 of the rods 11 acting on the flat iron 9 are situated with uniform spacings between them on a straight line running through the pivot axis (bearing pin 8) of the flat iron 9. The distance of the individual hinged joints 13 from the pivot axis 8 of the flat iron increases from the guide railings adjacent to the central guide railing 7' to the guide railings on the outside. The length of the individual rods 11 is designed and adjustable by threads on the hinged joints 12 and 13, so that the rods 11 and thus also the guide railings 7 are always aligned parallel to one another, even when the rotational position of the flat iron 9 changes. The mechanism described here comprises an adjustment device 1.

In the exemplary embodiment depicted here, clockwise slewing of the flat iron 9 causes a reduction in the distance and slewing in the opposite direction results in an increase in the distance between the guide railings 7. The narrow lanes for the containers 19 formed by the guide railings 7 always have a uniform width after operation of the adjustment device 1.

To operate the adjustment device 1, an operation device 20 is provided, consisting essentially of a threaded spindle 22 and a crank 14 mounted on it. The end of the threaded spindle 22 pointing toward the crank is mounted so it can rotate freely about a pivot bearing 15 which is situated on a stationary cantilever 21 mounted on one end of the guide rod 5. A second pivot bearing 16 having a threaded bore to receive the threaded spindle 22 is situated on the flat iron 9. If the thread of the threaded spindle 22 has a sufficient self-locking effect, no additional clamping is necessary to define the railing position set. Instead of the hand crank, a motor drive can also be used, preferably with a control unit in which the railing positions assigned to the various container sizes can be stored in a retrievable manner.

FIG. 1 also shows that several guide rods 5, 5' and 5" can be arranged at greater distances over the conveyor belts 3, with an adjustment device 1, 1',1" of the same design being assigned to each guide rod 5, 5', 5". In order for all adjustment devices to be acted upon simultaneously in actuation of the operating device 20, the flat irons 10 of the adjustment devices are coupled by rods 17 and joint heads 18. The length of the rod 17 is adjustable by a thread on the joint heads 18.

In the area between the guide rods 5 and 5', a mount 4 for a total of six sensors 23, one for each of the narrow lanes is arranged in the area between the guide rods 5 and 5' across the direction of conveyance T over the narrow lanes a, b, c, d, e, f. Only four of these six sensors are shown in FIG. 3. The mount 4 has two horizontal rods 24, 25 which are interconnected at the ends by one web 26 each. The two webs 26 are adjustable in height by means of clamping straps 27 on vertical pillars 28. The two pillars 28 are mounted laterally on the frame 6 of the conveyor device 2. The mount 4 together with the sensors 23 arranged on it may be adjustable in height by means of the clamping strap 27 and may thus be adapted to the height of the containers 19 to be conveyed, e.g., bottles or cans.

Each sensor 23 has a bearing block 29 which is arranged so that it can be displaced horizontally on the lower rod 25 of the mount 4. A vertical bearing plate 30 is attached to the left side of each bearing block 29 as seen in the direction of conveyance T. A horizontal bearing pin 31 is mounted on the right side of each bearing plate 30 with a swivel valve 32 having a switch lug 33 that protrudes upward pivotably mounted on the right side of each bearing plate 30. The swivel valve is raised by the head of a container 19 transported below it and past it, with the switch lug 33 being pivoted. The position of the switch lug 33 is determined by query by one or more electric switch elements 34 mounted on the bearing plate 30 and/or on the bearing block 29. For example, photoelectric barriers, inductive or capacitive generators may be used. The switch elements 34 generate a counting pulse with the passage of a container 19 and this pulse can be used in the usual way for inquiring as to the occupancy status of the narrow lanes a, b, c, d, e, f.

As FIG. 3 shows, a coupling element 35 in the form of a U-shaped section which is open toward the direction of conveyance T is rigidity mounted on each adjustable guide railing 7 in the area beneath the mount 4, so that the coupling element protrudes vertically upward. Each coupling element 35 surrounds with a low play the edge of a bearing plate 30, which points perpendicularly in the direction of conveyance T and thus it forms with it a type of telescoping guidance. The coverage area between the coupling element 35 and the bearing plate 30 is marked with hatching in FIG. 3.

In the case of an adjustment of the guides 7 by the adjustment device 1 and actuation device 20 described above, each sensor 23 is automatically shifted individually together with the others via the coupling element 35 acting on its bearing plate 30, but its lateral distance with respect to the respective guide railing 7 remaining unchanged. An appropriate width dimensioning of the swivel valves 32 ensures that they are operated in the desired manner by the upper container end in the case of all types of containers that may be encountered.

The horizontal adjustment of the sensors 23 as described above does not take any additional time and can be implemented with little structural complexity. If a height adjustment is also necessary, this can also be implemented with the help of the clamping strap 27 with only a few manipulations. This permits a relative movement in height between the coupling elements 35 and the bearing plates 30 without becoming disengaged.

Instead of assigning a separate switching element 34 to each swivel flap 32 and switch lug 33, a joint switch for all switch lugs 33 may also be provided, in particular in the form of a photoelectric barrier aligned in parallel with the rods 24, 25. The sensors may also function without mechanical swivel flaps or the like and may perform a direct non-contact scanning of the containers 19, e.g., by an optical or capacitive method. If no height adjustment for the sensors is provided, the coupling elements may also be designed rigidity between the guide railing and the sensor.

I claim:

1. Conveyor device (2) for containers (19), comprising:

multiple narrow lanes (a through f) formed by guide railings (7) that are adjustable horizontally and are positioned across a direction of conveyance (T);

sensors (23) for the containers along the narrow lanes, the sensors being adjustable horizontally across the direction of conveyance and coupled to the guide railings (7) in such a way that they are also necessarily adjusted along with any adjustment in the guide railings (7), the sensors (23) and the guide railings (7) each being arranged to be horizontally movable across the direction of transport (T) on their own separate mounts (4, 5) and each sensor (23) being connected to an adjustable guide railing (7) by a coupling element (35) wherein the mount (4) for the sensors (23) is adjustable in height, and the coupling elements (35) allow a relative movement in height between the guide railings (7) and the sensors (23).

2. Conveyor device according to claim 1, wherein each of the sensors (23) are arranged directly next to one of the guide railings (7) or the mounts for the guide railings.

3. Conveyor device (2) for containers (19), comprising:

multiple narrow lanes (a through f) formed by guide railings (7) that are adjustable horizontally and are positioned across a direction of conveyance (T);

sensors (23) for the containers along the narrow lanes, the sensors being adjustable horizontally across the direction of conveyance and coupled to the guide railings (7) in such a way that they are also necessarily adjusted along with any adjustment in the guide railings (7), the sensors (23) and the guide railings (7) each being arranged to be horizontally movable across the direction of transport (T) on their own separate mounts (4, 5) and each sensor (23) being connected to an adjustable guide railing (7) by a coupling element (35), wherein the mount (4) for the sensors (23) is adjustable in height, and the coupling elements (35) allow a relative movement in height between the guide railings (7) and the sensors (23), and wherein the coupling elements (35) are designed as telescoping guides.

4. Conveyor device according to claim 3, wherein each of the sensors (23) are arranged directly next to one of the guide railings (7) or the mounts for the guide railings.

* * * * *

UNITED STATES PATENT AND TRADEMARK OFFICE
CERTIFICATE OF CORRECTION

PATENT NO. : 7,207,428 B2 Page 1 of 1
APPLICATION NO. : 10/513161
DATED : April 24, 2007
INVENTOR(S) : Johann Hüttner It is certified that error appears in the above-identified patent and that said Letters Patent is hereby corrected as shown below:

On the First Page:

At field (30), "202 08 127" should be -- 20208127.3 --.

Signed and Sealed this

Twenty-seventh Day of November, 2007

JON W. DUDAS
*Director of the United States Patent and Trademark Office*